United States Patent
Hitomi et al.

(10) Patent No.: US 12,519,502 B2
(45) Date of Patent: Jan. 6, 2026

(54) RADIO-FREQUENCY CIRCUIT

(71) Applicant: Murata Manufacturing Co., Ltd., Nagaokakyo (JP)

(72) Inventors: Shinya Hitomi, Nagaokakyo (JP); Hirotsugu Mori, Nagaokakyo (JP)

(73) Assignee: MURATA MANUFACTURING CO., LTD., Nagaokakyo (JP)

(*) Notice: Subject to any disclaimer, the term of this patent is extended or adjusted under 35 U.S.C. 154(b) by 320 days.

(21) Appl. No.: 18/470,464

(22) Filed: Sep. 20, 2023

(65) Prior Publication Data

US 2024/0014845 A1    Jan. 11, 2024

Related U.S. Application Data

(63) Continuation of application No. PCT/JP2022/007116, filed on Feb. 22, 2022.

(30) Foreign Application Priority Data

Mar. 24, 2021   (JP) .................. 2021-050179

(51) Int. Cl.
   *H04B 1/44*   (2006.01)
(52) U.S. Cl.
   CPC ..................... *H04B 1/44* (2013.01)
(58) Field of Classification Search
   CPC ........................................ H04B 1/44
   See application file for complete search history.

(56) References Cited

U.S. PATENT DOCUMENTS

| | | | |
|---|---|---|---|
| 10,700,717 B1* | 6/2020 | Lee .......................... | H04B 1/44 |
| 2015/0133067 A1 | 5/2015 | Chang et al. | |
| 2019/0158137 A1* | 5/2019 | Brunel ..................... | H04B 1/04 |

FOREIGN PATENT DOCUMENTS

| | | |
|---|---|---|
| JP | H10-145147 A | 5/1998 |
| JP | 2004-173243 A | 6/2004 |
| JP | 2008-085775 A | 4/2008 |
| JP | 2021-064874 A | 4/2021 |
| WO | 2020/090382 A1 | 5/2020 |

OTHER PUBLICATIONS

International Search Report and Written Opinion mailed on May 24, 2022, received for PCT Application PCT/JP2022/007116, filed on Feb. 22, 2022, 8 pages including English Translation.

* cited by examiner

*Primary Examiner* — David Bilodeau
(74) *Attorney, Agent, or Firm* — XSENSUS LLP

(57) ABSTRACT

A radio-frequency circuit includes a first power amplifier, first and second filters, an attenuation circuit, and a switch. The first power amplifier supports a first power class which allows for maximum output power higher than power class 3. The first filter has a pass band including a first band and is connected between the first power amplifier and an antenna connecting terminal. The second filter has a pass band including a second band and is connected to the antenna connecting terminal. The radio-frequency circuit can perform simultaneous communication of the first band and the second band. The attenuation circuit and the switch are connected in series with each other between a ground and a transmit path connecting the first power amplifier and the antenna connecting terminal.

20 Claims, 10 Drawing Sheets

RADIO-FREQUENCY CIRCUIT

CROSS-REFERENCE TO RELATED APPLICATIONS

This is a continuation application of PCT International Application No. PCT/JP2022/007116 filed on Feb. 22, 2022, designating the United States of America, which is based on and claims priority of Japanese Patent Application No. 2021-050179 filed on Mar. 24, 2021. The entire disclosures of the above-identified applications, including the specifications, drawings, and claims are incorporated herein by reference in their entirety.

BACKGROUND OF THE DISCLOSURE

1. Field of the Disclosure

The present disclosure relates to a radio-frequency circuit.

2. Description of the Related Art

It is desired that current mobile phones, handle multiple communication systems (multimode) and multiple bands (multiband) with one terminal, and also implement simultaneous communication of multiple communication systems and/or multiple bands. For example, U.S. Patent Application Publication No. 2015/0133067 discloses a front-end module supporting carrier aggregation (CA).

Additionally, 3GPP (3rd Generation Partnership Project) is now discussing a power class that allows for maximum output power higher than before (hereinafter such a class may simply be called a high power class) mainly for a vehicle communication system or fixed wireless access (FWA).

SUMMARY OF THE DISCLOSURE

In the above-described related art, the use of a high power class in simultaneous communication of multiple bands may degrade the quality of a signal.

It is an object of the present disclosure to provide a radio-frequency circuit that can make it less likely to degrade the quality of a signal even with the use of a high power class in simultaneous communication of multiple bands.

A radio-frequency circuit according to an aspect of the disclosure includes a first power amplifier, first and second filters, an attenuation circuit, and a switch. The first power amplifier supports a first power class which allows for maximum output power higher than power class 3. The first filter has a pass band including a first band and is connected between the first power amplifier and an antenna connecting terminal. The second filter has a pass band including a second band and is connected to the antenna connecting terminal. The radio-frequency circuit can perform simultaneous communication of the first band and the second band. The attenuation circuit and the switch are connected in series with each other between a ground and a transmit path connecting the first power amplifier and the antenna connecting terminal. The attenuation circuit has an attenuation band including at least part of the second band and includes an inductor connected between the transmit path and the ground. The switch has a first terminal connected to the attenuation circuit and a second terminal connected to the transmit path or the ground. The switch connects the first terminal to the second terminal assuming the radio-frequency circuit is in a state to perform simultaneous communication of the first band and the second band. The switch does not connect the first terminal to the second terminal assuming the radio-frequency circuit is not in a state to perform simultaneous communication of the first band and the second band.

A radio-frequency circuit according to an aspect of the disclosure includes first and second power amplifiers, first and second filters, an attenuation circuit, and a switch. The first power amplifier supports a first power class which allows for maximum output power higher than power class 3. The first filter has a pass band including a first band and is connected between the first power amplifier and an antenna connecting terminal. The second filter has a pass band including a second band and is connected between the second power amplifier and the antenna connecting terminal. The radio-frequency circuit can perform simultaneous communication of the first band and the second band. The attenuation circuit and the switch are connected in series with each other between a ground and a transmit path connecting the second power amplifier and the antenna connecting terminal. The attenuation circuit has an attenuation band including at least part of the first band and includes an inductor which is connected between the transmit path and the ground. The switch has a first terminal connected to the attenuation circuit and a second terminal connected to the transmit path or the ground. The switch connects the first terminal to the second terminal assuming the radio-frequency circuit is in a state to perform simultaneous communication of the first band and the second band. The switch does not connect the first terminal to the second terminal assuming the radio-frequency circuit is not in a state to perform simultaneous communication of the first band and the second band.

The use of the radio-frequency circuit according to an aspect of the disclosure can make it less likely to degrade the quality of a signal even with the use of a high power class in simultaneous communication of multiple bands.

DESCRIPTION OF THE PREFERRED EMBODIMENTS

Figure 1:
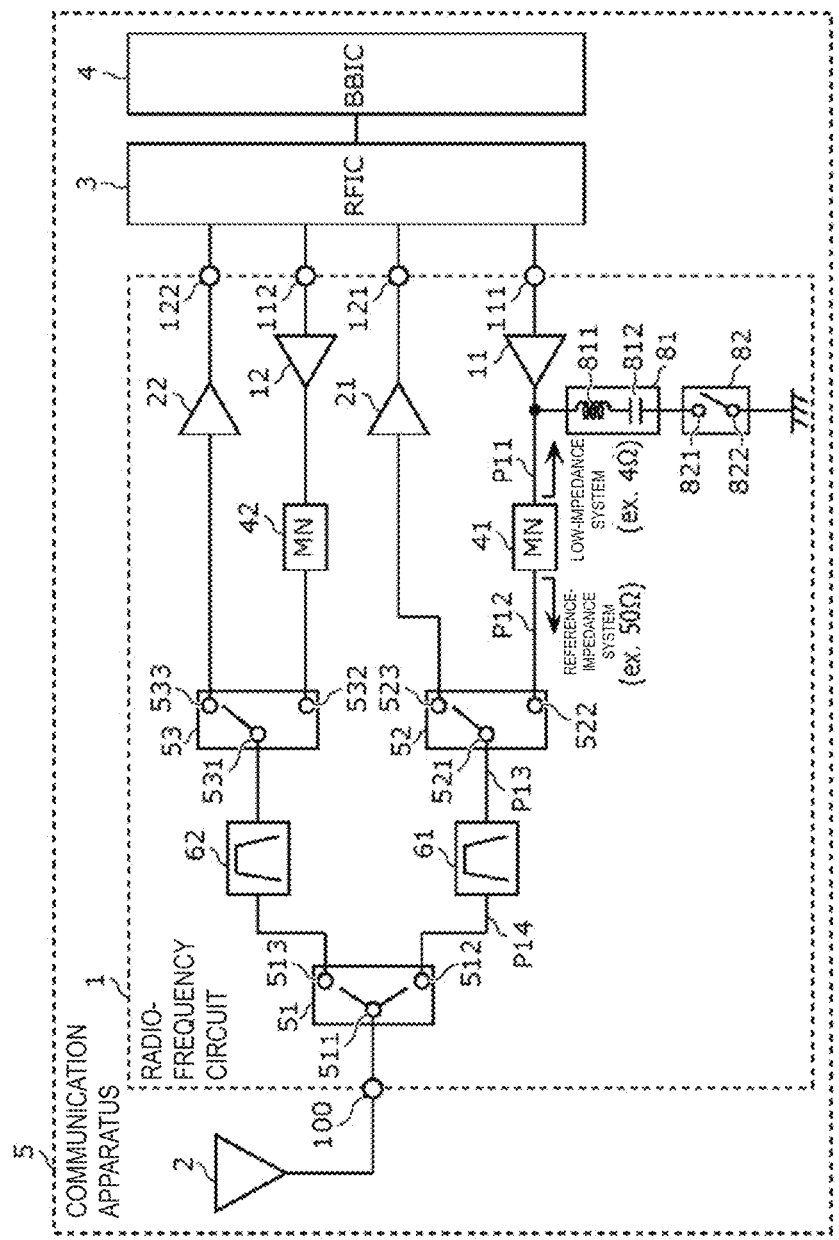
FIG. 1 is a circuit diagram of a radio-frequency circuit and a communication apparatus according to a first embodiment.

Embodiments of the disclosure will be described below in detail with reference to the accompanying drawings. The embodiments described below illustrate general or specific examples. Numerical values, configurations, materials, elements, and positions and connection states of the elements illustrated in the following embodiments are only examples and are not intended to limit the disclosure.

The drawings are only schematically shown and are not necessarily precisely illustrated. For the sake of representation, the drawings are illustrated in an exaggerated manner or with omissions and the ratios of elements in the drawings are adjusted according to the necessity. The shapes, positional relationships, and ratios of elements in the drawings may be different from those of the actual elements. In the drawings, substantially identical elements are designated by like reference numeral, and an explanation of such elements will not be repeated or be merely simplified.

In the circuit configuration of the disclosure, "A is connected to B" includes, both that A is directly connected to B using a connecting terminal and/or a wiring conductor, and also that A is electrically connected to B via another circuit element. "An element is connected between A and B" means that the element is connected to both A and B between A and B and includes the meaning that the element is connected in series with a path connecting A and B and also that the element is connected between this path and a ground.

First Embodiment

1.1 Circuit Configurations of Radio-Frequency Circuit 1 and Communication Apparatus 5

The circuit configuration of a radio-frequency circuit 1 according to a first embodiment and that of a communication apparatus 5 including the radio-frequency circuit 1 will be described below with reference to FIG. 1. FIG. 1 is a circuit diagram of the radio-frequency circuit 1 and the communication apparatus 5 according to the first embodiment.

[1.1.1 Circuit Configuration of Communication Apparatus 5]

The circuit configuration of the communication apparatus 5 will first be discussed. As illustrated in FIG. 1, the communication apparatus 5 according to the first embodiment includes the radio-frequency circuit 1, an antenna 2, a radio-frequency integrated circuit (RFIC) 3, and a baseband integrated circuit (BBIC) 4.

The radio-frequency circuit 1 transfers a radio-frequency signal between the antenna 2 and the RFIC 3. The internal configuration of the radio-frequency circuit 1 will be discussed later.

The antenna 2 is connected to an antenna connecting terminal 100 of the radio-frequency circuit 1. The antenna 2 receives a radio-frequency signal from the radio-frequency circuit 1 and outputs the radio-frequency signal to an external source. The antenna 2 also receives a radio-frequency signal from an external source and outputs the radio-frequency signal to the radio-frequency circuit 1.

The RFIC 3 is an example of a signal processing circuit that processes a radio-frequency signal. The RFIC 3 will be explained below more specifically. The RFIC 3 performs signal processing, such as down-conversion, on a radio-frequency reception signal, which is received via a receive path of the radio-frequency circuit 1, and outputs the resulting reception signal to the BBIC 4. The RFIC 3 includes a controller that controls elements, such as switch circuits and amplifier circuits, of the radio-frequency circuit 1. All or some of the functions of the RFIC 3 as the controller may be implemented in a source outside the RFIC 3, such as in the BBIC 4 or the radio-frequency circuit 1.

The BBIC 4 is a baseband signal processing circuit that performs signal processing by using an intermediate frequency band, which is lower than a radio-frequency signal transferred by the radio-frequency circuit 1. Examples of signals to be processed by the BBIC 4 are image signals for displaying images and/or audio signals for performing communication via a speaker.

The antenna 2 and the BBIC 4 are not essential elements for the communication apparatus 5 of the first embodiment.

[1.1.2 Circuit Configuration of Radio-Frequency Circuit 1]

The circuit configuration of the radio-frequency circuit 1 will now be described below. As illustrated in FIG. 1, the radio-frequency circuit 1 includes power amplifiers 11 and 12, low-noise amplifiers 21 and 22, matching circuits (MN) 41 and 42, switches 51 through 53 and 82, filters 61 and 62, an attenuation circuit 81, an antenna connecting terminal 100, radio-frequency input terminals 111 and 112, and radio-frequency output terminals 121 and 122.

The antenna connecting terminal 100 is connected to the antenna 2 at the outside of the radio-frequency circuit 1.

Each of the radio-frequency input terminals 111 and 112 is a terminal for receiving a radio-frequency transmission signal from the outside of the radio-frequency circuit 1. In the first embodiment, the radio-frequency input terminals 111 and 112 are connected to the RFIC 3 outside the radio-frequency circuit 1.

Each of the radio-frequency output terminals 121 and 122 is a terminal for outputting a radio-frequency reception signal to the outside of the radio-frequency circuit 1. In the first embodiment, the radio-frequency output terminals 121 and 122 are connected to the RFIC 3 outside the radio-frequency circuit 1.

The power amplifier 11 is an example of a first power amplifier. The power amplifier 11 supports a first power class that allows for maximum output power higher than power class 3. The first power class is high power class, such as power classes 2, 1.5, and 1. The power amplifier 11 is connected between the radio-frequency input terminal 111 and the filter 61. More specifically, the input terminal of the power amplifier 11 is connected to the radio-frequency input terminal 111, while the output terminal of the power amplifier 11 is connected to the filter 61 via the matching circuit 41 and the switch 52. The power amplifier 11 is able to amplify a transmission signal of band A up to power that satisfies the maximum output power of the first power class.

The power amplifier 12 is an example of a second power amplifier. The power amplifier 12 supports a second power class that allows for maximum output power lower than or equal to power class 3. The second power class is non-high power class, such as power classes 3 and 4. The power amplifier 12 is connected between the radio-frequency input terminal 112 and the filter 62. More specifically, the input terminal of the power amplifier 12 is connected to the radio-frequency input terminal 112, while the output terminal of the power amplifier 12 is connected to the filter 62 via the matching circuit 42 and the switch 53. The power amplifier 12 is able to amplify a transmission signal of band B up to power that satisfies the maximum output power of the second power class, but not up to power that satisfies the maximum output power of the first power class.

The power amplifiers 11 and 12 are electronic components that amplify an input signal (transmission signal) to generate an output signal having energy higher than the input signal, based on power supplied from a power source. The power amplifiers 11 and 12 each include an amplifying transistor and may also include an inductor and/or a capacitor. In the first embodiment, the internal configuration of the power amplifiers 11 and 12 is not restricted to a particular configuration. For example, each of the power amplifiers 11 and 12 may be a multistage amplifier, a differential amplifier, or the Doherty amplifier.

The power class is the classification of output power of a terminal, which is defined by the maximum output power of the terminal, for example. As the value of the power class is smaller, output power is higher. For example, 3GPP defines the values of the maximum output power of the individual power classes as follows: power class 1 is 31 dBm; power class 1.5 is 29 dBm; power class 2 is 26 dBm; and power class 3 is 23 dBm.

The maximum output power of a terminal is determined by the output power at the end portion of the antenna of the terminal. The maximum output power of a terminal is measured by a method defined by 3GPP, for example. For instance, in FIG. 1, the maximum output power can be determined by measuring radiation power of the antenna 2. Instead of measuring radiation power, the output power of the antenna 2 may be measured by using a measurement instrument, such as a spectrum analyzer, connected to a terminal provided near the antenna 2.

The power class supported by a power amplifier can be identified by the maximum output power of the power amplifier. For example, the maximum output power of a power amplifier which supports power class 1 is higher than 31 dBm. Typically, the maximum output power of a power amplifier is determined by the size and the semiconductor material of a semiconductor device forming the power amplifier. For example, as the maximum output power is higher, the size of a semiconductor device is larger. For example, it is assumed that the semiconductor device forming one power amplifier and that of another power amplifier are made of the same semiconductor material. In this case, as a result of comparing the size of the semiconductor device of one power amplifier and that of the other power amplifier with each other, the relative power class supported by one power amplifier and that by the other power amplifier may be determined. Additionally, there may be a case in which a specific high-power semiconductor material, such as gallium nitride (GaN) or silicon carbide (SiC), is used for the semiconductor device forming a power amplifier having high maximum output power. In this case, as a result of comparing the semiconductor material used for the semiconductor device forming one power amplifier and that for another power amplifier, the relative power class supported by one power amplifier and that by the other power amplifier may be determined.

The low-noise amplifier 21 is connected between the filter 61 and the radio-frequency output terminal 121. More specifically, the input terminal of the low-noise amplifier 21 is connected to the filter 61 via the switch 52, while the output terminal of the low-noise amplifier 21 is connected to the radio-frequency output terminal 121. The low-noise amplifier 21 is able to amplify a reception signal of band A.

The low-noise amplifier 22 is connected between the filter 62 and the radio-frequency output terminal 122. More specifically, the input terminal of the low-noise amplifier 22 is connected to the filter 62 via the switch 53, while the output terminal of the low-noise amplifier 22 is connected to the radio-frequency output terminal 122. The low-noise amplifier 22 is able to amplify a reception signal of band B.

The matching circuit 41 is connected between the power amplifier 11 and the filter 61. More specifically, the matching circuit 41 is connected to the power amplifier 11 and is also connected to the filter 61 via the switch 52. The matching circuit 41 is an impedance matching circuit and can provide matching between the output impedance (low impedance, 4 ohms, for example) of the power amplifier 11 and the input impedance (reference impedance, 50 ohms, for example) of the switch 52. The matching circuit 41 may be constituted by an inductor and/or a capacitor, for example.

The matching circuit 42 is connected between the power amplifier 12 and the filter 62. More specifically, the matching circuit 42 is connected to the power amplifier 12 and is also connected to the filter 62 via the switch 53. The matching circuit 42 is an impedance matching circuit and can provide matching between the output impedance (low impedance) of the power amplifier 12 and the input impedance (reference impedance) of the switch 53. The matching circuit 42 may be constituted by an inductor and/or a capacitor, for example.

The switch 51 is connected between the antenna connecting terminal 100 and the filters 61 and 62. The switch 51 has terminals 511, 512, and 513. The terminal 511 is connected to the antenna connecting terminal 100. The terminal 512 is connected to the filter 61. The terminal 513 is connected to the filter 62.

With this connection configuration, the switch 51 can connect the terminal 511 to the terminal 512 and/or to the terminal 513, based on a control signal from the RFIC 3, for example. This will be discussed more specifically. The switch 51 can selectively connect or disconnect the antenna connecting terminal 100 to or from the filter 61. The switch 51 can also selectively connect or disconnect the antenna connecting terminal 100 to or from the filter 62. That is, the switch 51 can independently perform the switching operation to connect or disconnect the antenna connecting terminal 100 to or from the filter 61 and the switching operation to connect or disconnect the antenna connecting terminal 100 to or from the filter 62. The switch 51 is constituted by a multiple-connection switch circuit, for example.

The switch 52 is connected between the filter 61 and each of the power amplifier 11 and the low-noise amplifier 21. The switch 52 has terminals 521, 522, and 523. The terminal 521 is connected to the filter 61. The terminal 522 is connected to the power amplifier 11 via the matching circuit 41. The terminal 523 is connected to the low-noise amplifier 21.

With this connection configuration, the switch 52 can connect the terminal 521 to one of the terminals 522 and 523, based on a control signal from the RFIC 3, for example. That is, the switch 52 can selectively connect the filter 61 to the power amplifier 11 or to the low-noise amplifier 21. The switch 52 is constituted by a single-pole double-throw (SPDT) switch circuit, for example.

The switch 53 is connected between the filter 62 and each of the power amplifier 12 and the low-noise amplifier 22. The switch 53 has terminals 531, 532, and 533. The terminal 531 is connected to the filter 62. The terminal 532 is connected to the power amplifier 12 via the matching circuit 42. The terminal 533 is connected to the low-noise amplifier 22.

With this connection configuration, the switch 53 can connect the terminal 531 to one of the terminals 532 and 533, based on a control signal from the RFIC 3, for example. That is, the switch 53 can selectively connect the filter 62 to the power amplifier 12 or to the low-noise amplifier 22. The switch 53 is constituted by a SPDT switch circuit, for example.

The filter 61 is an example of a first filter. The filter 61 has a pass band including band A and is connected between the power amplifier 11 and the antenna connecting terminal 100. More specifically, one end of the filter 61 is connected to the power amplifier 11 and to the low-noise amplifier 21 via the switch 52, while the other end of the filter 61 is connected to the antenna connecting terminal 100 via the switch 51. The filter 61 can pass a transmission signal of band A amplified by the power amplifier 11 to the antenna connecting terminal 100. The filter 61 can also pass a reception signal of band A received via the antenna connecting terminal 100 to the low-noise amplifier 21.

The filter 62 is an example of a second filter. The filter 62 has a pass band including band B and is connected between the power amplifier 12 and the antenna connecting terminal 100. More specifically, one end of the filter 62 is connected to the power amplifier 12 and to the low-noise amplifier 22 via the switch 53, while the other end of the filter 62 is connected to the antenna connecting terminal 100 via the switch 51. The filter 62 can pass a transmission signal of band B amplified by the power amplifier 12 to the antenna connecting terminal 100. The filter 62 can also pass a reception signal of band B received via the antenna connecting terminal 100 to the low-noise amplifier 22.

The filters 61 and 62 may be constituted by any of surface acoustic wave (SAW) filters, bulk acoustic wave (BAW) filters, LC resonance filters, and dielectric filters. The filters 61 and 62 may be constituted by another type of filter other than the above-described types of filters.

The attenuation circuit 81 has an attenuation band including at least part of band B. The attenuation circuit 81 includes an inductor 811 and a capacitor 812 connected in series with each other between a ground and a transmit path which connects the power amplifier 11 and the antenna connecting terminal 100. In the example in FIG. 1, the attenuation circuit 81 is connected between a ground and a transmit path P11 between the power amplifier 11 and the matching circuit 41. That is, the attenuation circuit 81 is disposed on a low-impedance-system path. The provision of the capacitor 812 in the attenuation circuit 81 may be omitted.

The switch 82 can switch between ON and OFF of a parallel arm path on which the attenuation circuit 81 is disposed. More specifically, the switch 82 is connected to the parallel arm path in series with the attenuation circuit 81. The switch 82 has terminals 821 and 822. The terminal 821, which is an example of a first terminal, is connected to the attenuation circuit 81. The terminal 822, which is an example of a second terminal, is connected to a ground.

With this connection configuration, based on a control signal from the RFIC 3, for example, the switch 82 connects the terminal 821 to the terminal 822 assuming the radio-frequency circuit 1 is in a state to perform simultaneous communication of band A and band B and does not connect the terminal 821 to the terminal 822 assuming the radio-frequency circuit 1 is not in a state to perform simultaneous communication of band A and band B. The switch 82 is constituted by a single-pole single-throw (SPST) switch circuit, for example.

In the example in FIG. 1, the switch 82 is connected between the attenuation circuit 81 and a ground. However, the position of the switch 82 is not limited to this position. For example, the switch 82 may be connected between the attenuation circuit 81 and the transmit path P11. In this case, the terminal 821 is connected to the attenuation circuit 81 and the terminal 822 is connected to the transmit path P11.

The attenuation circuit 81 and the switch 82 are connected between the transmit path P11 and a ground. However, the position of the attenuation circuit 81 and the switch 82 is not limited to this position. For example, the attenuation circuit 81 and the switch 82 may be connected between a ground and one of a transmit path P12 between the matching circuit 41 and the switch 52, a transmit path P13 between the switch 52 and the filter 61, and a transmit path P14 between the filter 61 and the switch 51.

Among the circuit elements shown in FIG. 1, the provision of one or more circuit elements in the radio-frequency circuit 1 may be omitted. For example, the provision of at least one of the power amplifier 12, low-noise amplifiers 21 and 22, matching circuits 41 and 42, and the switches 51 through 53 in the radio-frequency circuit 1 may be omitted.

The radio-frequency circuit 1 according to the first embodiment may be mounted on one module laminate. However, this is only an example. For instance, the radio-frequency circuit 1 may be distributed over plural module laminates and be mounted on them. In this case, the plural module laminates may be connected to different antennas. More specifically, for example, the power amplifier 11, low-noise amplifier 21, matching circuit 41, switch 52, filter 61, attenuation circuit 81, antenna connecting terminal, radio-frequency input terminal 111, and radio-frequency output terminal 121 may be mounted on a first module laminate, while the power amplifier 12, low-noise amplifier 22, matching circuit 42, switch 53, filter 62, antenna connecting terminal, radio-frequency input terminal 112, and radio-frequency output terminal 122 may be mounted on a second module laminate. In this case, the antenna connecting terminal mounted on the first module laminate and that on the second module laminate may be connected to different antennas.

1.2 Specific Examples of Band a and Band B

Some specific examples of band A and band B that can be used in the first embodiment will be discussed below.

Band A is an example of a first band. Band A is a frequency band to be used for a communication system constructed using a radio access technology (RAT). Such a frequency band is predefined by a standardizing body (such as 3GPP and Institute of Electrical and Electronics Engineers (IEEE)). Band A corresponds to the first power class.

In the first embodiment, as band A, a time division duplex (TDD) band is used. More specifically, as band A, n77, n78, n79, or n41 for 5GNR (5th generation New Radio), for example, may be used.

Band B is an example of a second band. Band B is a frequency band to be used for a communication system and can be simultaneously transmitted and/or received with band A. That is, a transmission signal and/or a reception signal of band B can be used simultaneously with a transmission signal of band A. Band B corresponds to the second power class, but does not correspond to the first power class.

In the first embodiment, as band B, a TDD band is used. More specifically, as band B, n46 or n96 for 5GNR, for example, may be used. Assuming n79 for 5GNR is used as band A, Band 42 or Band 48 for long term evolution (LTE) may be used as band B.

Band A and band B are not limited to TDD bands. As band A and/or band B, a frequency division duplex (FDD) band may be used. For example, Band 1, 2, 3, 4, 5, 12, 14, 30, or 66 for LTE or n1, n2, n3, n5, n12, n14, n30, or n66 for 5GNR may be used. For instance, assuming a TDD band is used as band A and an FDD band is used as band B, simultaneous communication of a TDD band corresponding to the first power class and an FDD band corresponding to the second power class is implemented. Band A and band B are not limited to 5GNR frequency bands and/or LTE frequency bands. For example, as band A and/or band B, a band or a channel for a wireless local area network (WLAN) may be used.

1.3 Signal Flows in Individual Connection States of Radio-Frequency Circuit 1

Figure 2:
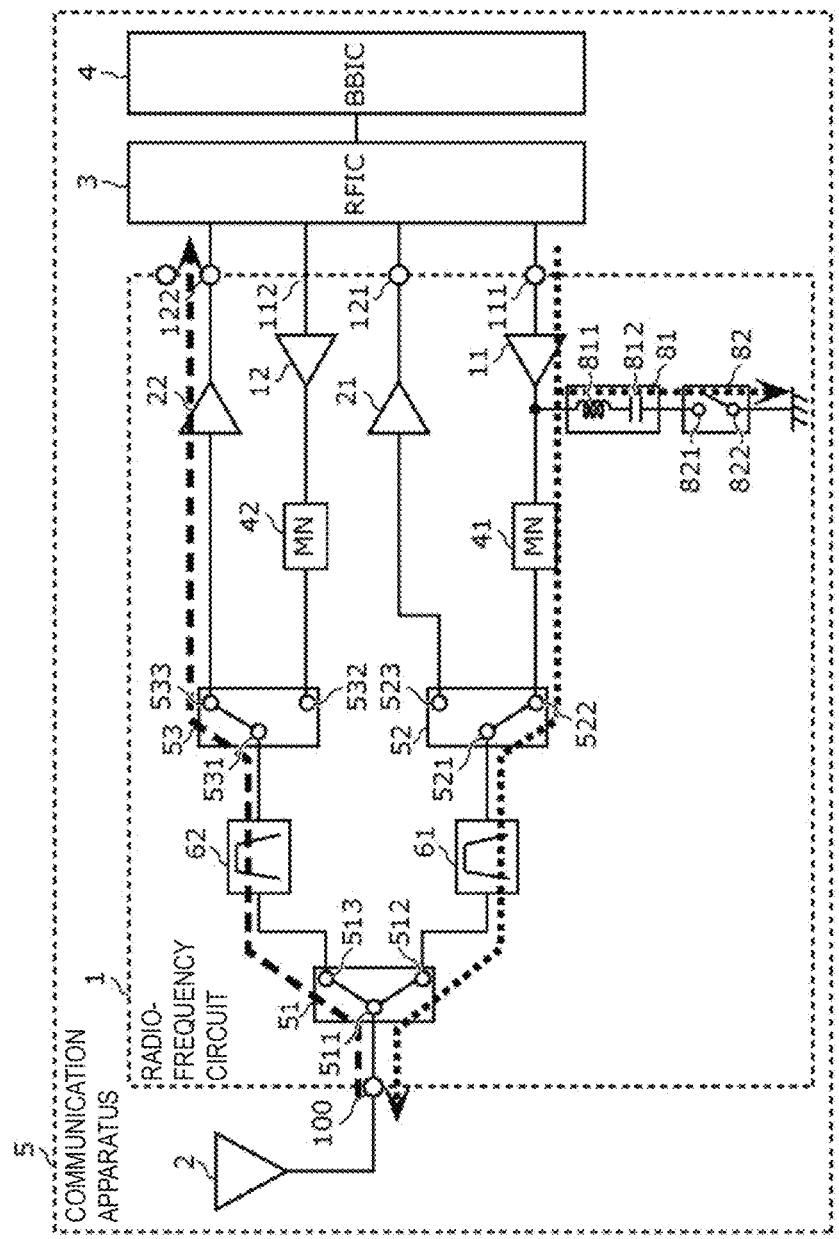
FIG. 2 illustrates a signal flow in a first connection state of the radio-frequency circuit according to the first embodiment.
Figure 3:
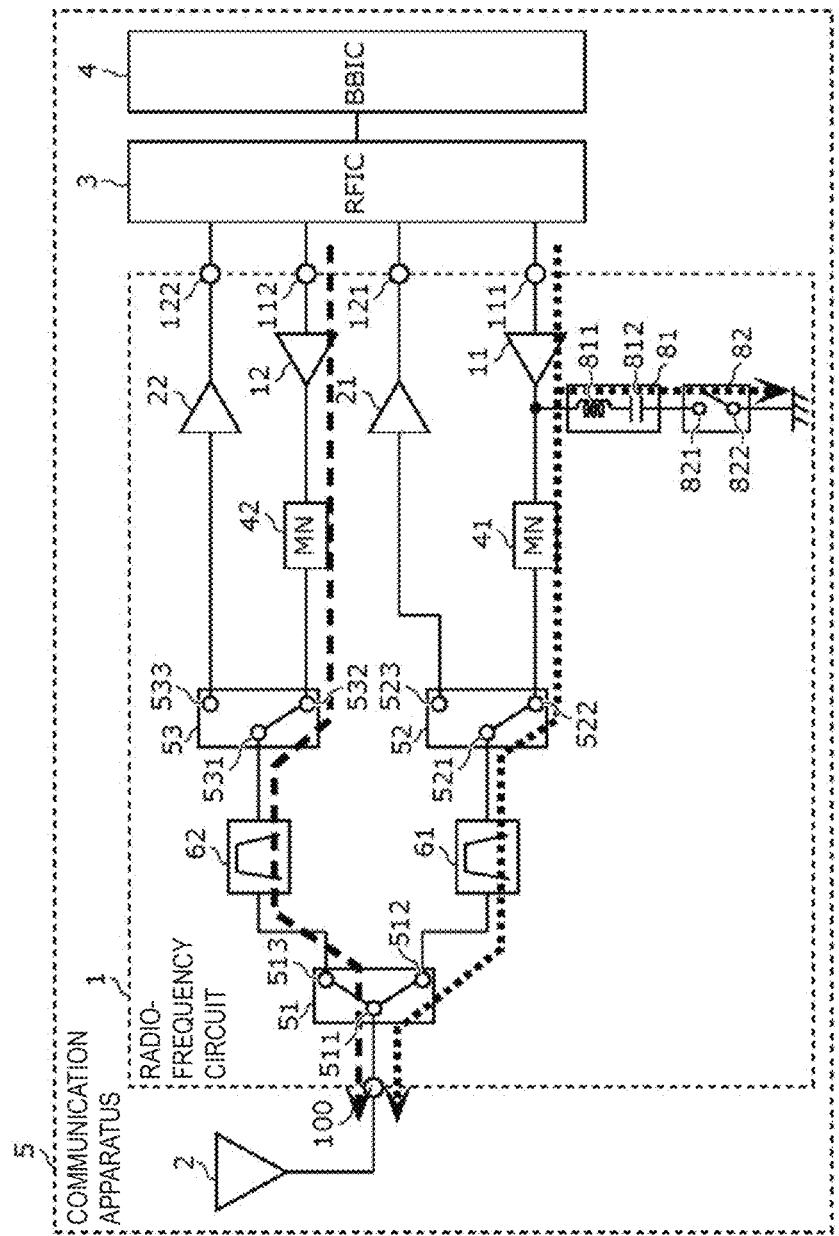
FIG. 3 illustrates a signal flow in a second connection state of the radio-frequency circuit according to the first embodiment.
Figure 4:
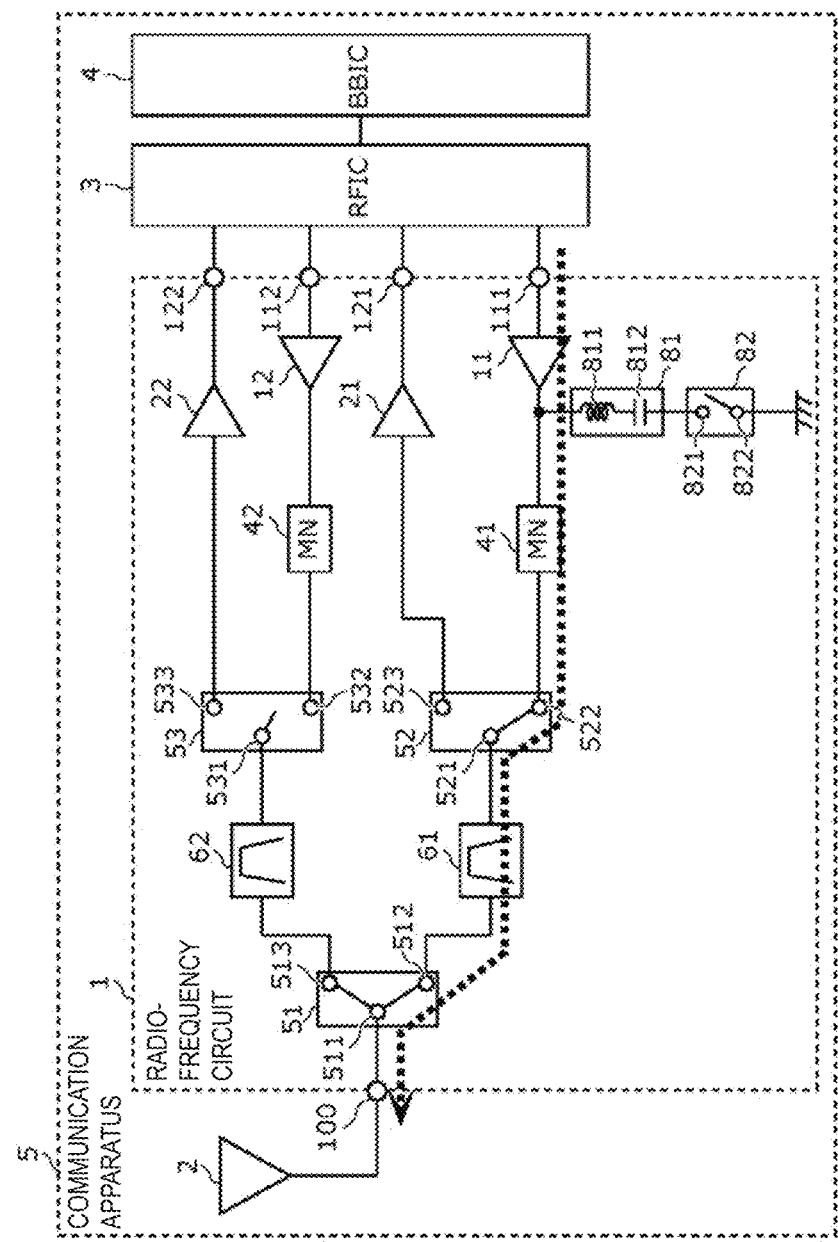
FIG. 4 illustrates a signal flow in a third connection state of the radio-frequency circuit according to the first embodiment.

Connection states of the radio-frequency circuit 1 according to the first embodiment and a specific example of a signal flow in each connection state will now be explained below with reference to FIGS. 2 through 4. FIG. 2 illustrates a signal flow in a first connection state of the radio-frequency circuit 1. FIG. 3 illustrates a signal flow in a second connection state of the radio-frequency circuit 1. FIG. 4 illustrates a signal flow in a third connection state of the radio-frequency circuit 1.

FIG. 2 illustrates the first connection state in which the radio-frequency circuit 1 simultaneously performs the transmission of band A and the reception of band B. That is, FIG. 2 shows a state in which the radio-frequency circuit 1 performs simultaneous communication of band A and band B. The RFIC 3 can implement the first connection state by controlling the switch circuits of the radio-frequency circuit 1. In the first connection state: the switch 51 connects the terminal 511 to both of the terminals 512 and 513; the switch 52 connects the terminal 521 to the terminal 522; and the switch 53 connects the terminal 531 to the terminal 533. In this state, the switch 82 connects the terminal 821 to the terminal 822.

With this connection state, a transmission signal of band A flows from the radio-frequency input terminal 111 to the antenna connecting terminal 100 via the power amplifier 11, matching circuit 41, switch 52, filter 61, and switch 51. During the flowing of the transmission signal of band A, components of band B (spurious components) included in the transmission signal amplified by the amplifier 11 flow to a ground via the attenuation circuit 81 and the switch 82. Meanwhile, a reception signal of band B flows from the antenna connecting terminal 100 to the radio-frequency output terminal 122 via the switch 51, filter 62, switch 53, and low-noise amplifier 22.

FIG. 3 illustrates the second connection state in which the radio-frequency circuit 1 simultaneously performs the transmission of band A and the transmission of band B. That is, FIG. 3 shows a state in which the radio-frequency circuit 1 performs simultaneous communication of band A and band B. The RFIC 3 can implement the second connection state by controlling the switch circuits of the radio-frequency circuit 1. In the second connection state: the switch 51 connects the terminal 511 to both of the terminals 512 and 513; the switch 52 connects the terminal 521 to the terminal 522; and the switch 53 connects the terminal 531 to the terminal 532. In this state, the switch 82 connects the terminal 821 to the terminal 822.

With this connection state, a transmission signal of band A flows from the radio-frequency input terminal 111 to the antenna connecting terminal 100 via the power amplifier 11, matching circuit 41, switch 52, filter 61, and switch 51. During the flowing of the transmission signal of band A, components (spurious components) of band B included in the transmission signal amplified by the amplifier 11 flow to a ground via the attenuation circuit 81 and the switch 82. Meanwhile, a transmission signal of band B flows from the radio-frequency input terminal 112 to the antenna connecting terminal 100 via the power amplifier 12, matching circuit 42, switch 53, filter 62, and switch 51.

FIG. 4 illustrates the third connection state of the radio-frequency circuit 1 in which the transmission of band A is performed and neither of the transmission nor the reception of band B is performed. That is, FIG. 4 shows a state in which the radio-frequency circuit 1 does not perform simultaneous communication of band A and band B. The RFIC 3 can implement the third connection state by controlling the switch circuits of the radio-frequency circuit 1. In the third connection state: the switch 51 connects the terminal 511 to the terminal 512; and the switch 52 connects the terminal 521 to the terminal 522. In this state, the switch 82 does not connect the terminal 821 to the terminal 822.

With this connection state, a transmission signal of band A flows from the radio-frequency input terminal 111 to the antenna connecting terminal 100 via the power amplifier 11, matching circuit 41, switch 52, filter 61, and switch 51. During the flowing of the transmission signal of band A, no signal flows through the attenuation circuit 81.

1.4 Advantages and Others

As described above, a radio-frequency circuit 1 according to the first embodiment includes a power amplifier 11, filters 61 and 62, an attenuation circuit 81, and a switch 82. The power amplifier 11 supports a first power class which allows for maximum output power higher than power class 3. The filter 61 has a pass band including band A and is connected between the power amplifier 11 and an antenna connecting terminal 100. The filter 62 has a pass band including band B and is connected to the antenna connecting terminal 100. The radio-frequency circuit 1 can perform simultaneous communication of band A and band B. The attenuation circuit 81 and the switch 82 are connected in series with each other between a ground and a transmit path which connects the power amplifier 11 and the antenna connecting terminal 100. The attenuation circuit 81 has an attenuation band including at least part of band B and includes an inductor 811 which is connected between the transmit path and the ground. The switch 82 has a terminal 821 connected to the attenuation circuit 81 and a terminal 822 connected to the transmit path or the ground. The switch 82 connects the terminal 821 to the terminal 822 assuming the radio-frequency circuit 1 is in a state to perform simultaneous communication of band A and band B. The switch 82 does not connect the terminal 821 to the terminal 822 assuming the radio-frequency circuit 1 is not in a state to perform simultaneous communication of band A and band B.

With the above-described configuration, assuming the radio-frequency circuit 1 is in a state to perform simultaneous communication of band A and band B, the attenuation circuit 81 can be connected to the transmit path of a signal of band A. It is thus possible to attenuate components of band B (spurious components) included in a high-power transmission signal amplified by the power amplifier 11. This can make it less likely to degrade the quality of a transmission signal and/or a reception signal of band B for which the radio-frequency circuit 1 performs simultaneous communication together with a transmission signal of band A. Examples of possible degradation of the signal quality are an increase in the error vector magnitude (EVM) and an increase in the noise figure (NF). Assuming the radio-frequency circuit 1 is not in a state to perform simultaneous communication of band A and band B, the attenuation circuit 81 is not connected to the transmit path of a signal of band A. This can reduce a signal loss and a mismatching loss which would be caused by the attenuation circuit 81, thereby improving the electrical characteristics of the radio-frequency circuit 1.

In one example, in the radio-frequency circuit 1 according to the first embodiment, the attenuation circuit 81 may also include a capacitor 812, which is connected in series with the inductor 811, between the transmit path and the ground.

With this configuration, too, the radio-frequency circuit 1 can achieve advantages similar to those described above.

In one example, the radio-frequency circuit 1 according to the first embodiment may also include a matching circuit 41 that is connected between the power amplifier 11 and the filter 61. The attenuation circuit 81 may be connected between the power amplifier 11 and the matching circuit 41.

With this configuration, an LC series circuit is disposed on a parallel arm path of the output impedance (that is, low impedance) system of the power amplifier 11. The LC series circuit can thus function as an attenuation pole having a low Q factor. The attenuation circuit 81 can thus implement the attenuation in a wide band.

In one example, in the radio-frequency circuit 1 according to the first embodiment, the terminal 822 of the switch 82 may be connected to the ground.

With this configuration, assuming the switch 82 is constituted by a field-effect transistor (FET), the source of the FET can be connected to the ground. Assuming the switch 82 is turned ON with the application of a voltage to the gate of the FET, the potential difference between the gate and the source can be increased, thereby reducing the impedance between the drain and the source.

In one example, the radio-frequency circuit 1 according to the first embodiment may also include a power amplifier 12. The filter 62 may be connected between the antenna connecting terminal 100 and the power amplifier 12.

With this configuration, a transmission signal of band B can be simultaneously transmitted with a transmission signal of band A corresponding to the first power class. During the simultaneous transmission, the degradation of the transmission signal of band B can be reduced.

In one example, in the radio-frequency circuit 1 according to the first embodiment, the power amplifier 12 may support a second power class which allows for maximum output power lower than or equal to power class 3.

With this configuration, a transmission signal of band B corresponding to the second power class can be simultaneously transmitted with a transmission signal of band A corresponding to the first power class. During the simultaneous transmission, the degradation of the transmission signal of band B can be reduced.

In one example, the radio-frequency circuit 1 according to the first embodiment may further include a low-noise amplifier 22. The filter 62 may be connected between the antenna connecting terminal 100 and the low-noise amplifier 22.

With this configuration, a reception signal of band B can be simultaneously received with the transmission of a transmission signal of band A corresponding to the first power class. During the simultaneous reception and transmission, the degradation of the reception signal of band B can be reduced.

In one example, in the radio-frequency circuit 1 according to the first embodiment, band A may be n77, n78, n79, or n41 for 5GNR, and band B may be n46 or n96 for 5GNR.

With this configuration, the radio-frequency circuit 1 can be used to perform simultaneous transmission of a signal of n77, n78, n79, or n41 for 5GNR and a signal of n46 or n96 for 5GNR and/or to perform simultaneous transmission and reception of a signal of n77, n78, n79, or n41 for 5GNR and a signal of n46 or n96 for 5GNR.

In one example, in the radio-frequency circuit 1 according to the first embodiment, band A may be n79 for 5GNR, and band B may be Band 42 or Band 48 for LTE.

With this configuration, the radio-frequency circuit 1 can be used to perform simultaneous transmission of a signal of n79 for 5GNR and a signal of Band 42 or Band 48 for LTE and/or to perform simultaneous transmission and reception of a signal of n79 for 5GNR and a signal of Band 42 or Band 48 for LTE.

A communication apparatus 5 according to the first embodiment includes an RFIC 3 that processes a radio-frequency signal and the radio-frequency circuit 1 that transfers a radio-frequency signal between the RFIC 3 and an antenna 2.

With this configuration, the advantages of the radio-frequency circuit 1 can be implemented by the communication apparatus 5.

First Modified Example

A first modified example will be described below. The first modified example is different from the first embodiment mainly in that a power amplifier supporting the first power class and a power amplifier supporting the second power class are switched therebetween to amplify a transmission signal of band A. The circuit configuration of the power amplifiers and their surrounding elements in the first modified example will be specifically explained below with reference to FIG. 5.

Figure 5:
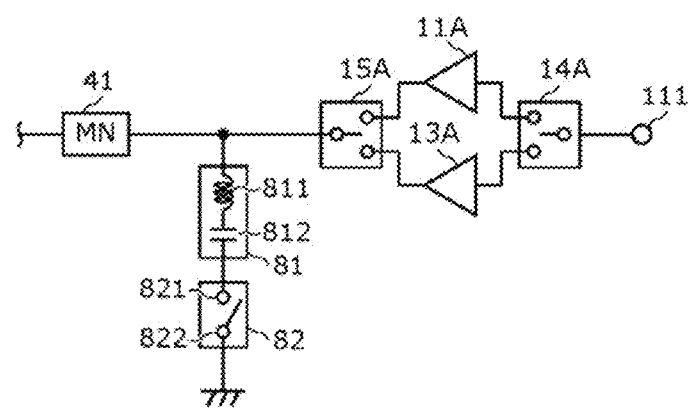
FIG. 5 is a circuit diagram of power amplifiers and their surrounding elements in a first modified example.

FIG. 5 is a circuit diagram of power amplifiers 11A and 13A and their surrounding elements in the first modified example. The radio-frequency circuit 1 according to the first modified example includes the power amplifiers 11A and 13A and switches 14A and 15A, instead of the power amplifier 11.

As in the power amplifier 11, the power amplifier 11A is an example of the first power amplifier and supports the first power class. The power amplifier 11A is connected between the radio-frequency input terminal 111 and the matching circuit 41. More specifically, the input terminal of the power amplifier 11A is connected to the radio-frequency input terminal 111 via the switch 14A, while the output terminal of the power amplifier 11A is connected to the matching circuit 41 via the switch 15A. The power amplifier 11A is able to amplify a transmission signal of band A up to power that satisfies the maximum output power of the first power class.

The power amplifier 13A supports the second power class. The power amplifier 13A is connected between the radio-frequency input terminal 111 and the matching circuit 41. More specifically, the input terminal of the power amplifier 13A is connected to the radio-frequency input terminal 111 via the switch 14A, while the output terminal of the power amplifier 13A is connected to the matching circuit 41 via the switch 15A. The power amplifier 13A is able to amplify a transmission signal of band A up to power that satisfies the maximum output power of the second power class.

The switch 14A can selectively connect the radio-frequency input terminal 111 to one of the power amplifiers 11A and 13A. The switch 14A is constituted by a SPDT switch circuit, for example.

The switch 15A can selectively connect the matching circuit 41 to one of the power amplifiers 11A and 13A. The switch 15A is constituted by a SPDT switch circuit, for example.

Assuming band A corresponds to the first power class, for example, the switch 14A connects the power amplifier 11A to the radio-frequency input terminal 111, and the switch 15A connects the power amplifier 11A to the matching circuit 41. Assuming band A corresponds to the second power class, for example, the switch 14A connects the power amplifier 13A to the radio-frequency input terminal 111, and the switch 15A connects the power amplifier 13A to the matching circuit 41.

The switch 82 connects the terminal 821 to the terminal 822 assuming the radio-frequency circuit 1 is in a state to perform simultaneous communication of band A and band B. The switch 82 does not connect the terminal 821 to the terminal 822 assuming the radio-frequency circuit 1 is not in a state to perform simultaneous communication of band A and band B. Assuming band A does not correspond to the first power class but corresponds to the second power class, the connecting of the terminal 821 to the terminal 822 in the switch 82 is not essential, regardless of whether the radio-frequency circuit 1 is in a state to perform simultaneous communication of band A and band B.

Second Modified Example

A second modified example will be described below. The second modified example is different from the first embodiment mainly in that a differential amplifier circuit is used as a power amplifier supporting the first power class. The circuit configuration of power amplifiers and their surrounding elements in the second modified example will be specifically explained below with reference to FIG. 6.

Figure 6:
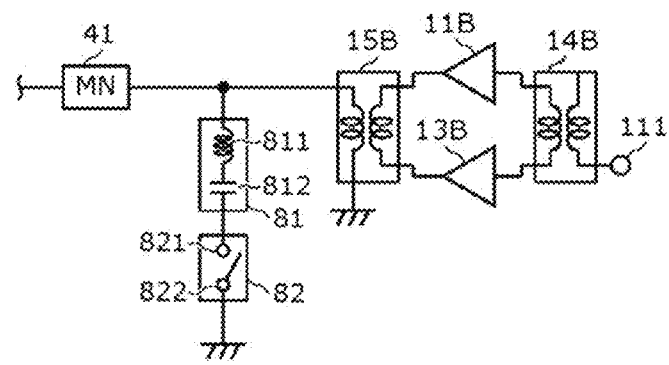
FIG. 6 is a circuit diagram of power amplifiers and their surrounding elements in a second modified example.

FIG. 6 is a circuit diagram of power amplifiers 11B and 13B and their surrounding elements in the second modified example. The radio-frequency circuit 1 according to the second modified example includes the power amplifiers 11B and 13B and transformers 14B and 15B, instead of the power amplifier 11.

The transformer 14B can divide one signal into two signals in opposite phase. That is, the transformer 14B can convert a single-ended signal into a differential signal. The transformer 14B includes two coils.

The transformer 15B can combine two signals in opposite phase into one signal. That is, the transformer 15B can convert a differential signal into a single-ended signal. The transformer 15B includes two coils.

The power amplifier 11B can amplify one of two signals, which are obtained by dividing one signal by the transformer 14B. The input terminal of the power amplifier 11B is connected to one end of a coil in the transformer 14B, while the output terminal of the power amplifier 11B is connected to one end of a coil in the transformer 15B.

The power amplifier 13B can amplify the other one of the two signals, which are obtained by dividing one signal by the transformer 14B. The input terminal of the power amplifier 13B is connected to the other end of the coil in the transformer 14B, while the output terminal of the power amplifier 13B is connected to the other end of the coil in the transformer 15B.

The circuit configuration shown in FIG. 6 is only an example of the differential amplifier circuit. The differential amplifier circuit is not restricted to this configuration. For example, the differential amplifier circuit may include another power amplifier between the radio-frequency input terminal 111 and the transformer 14B.

Instead of the differential amplifier circuit, a Wilkinson amplifier circuit may be used. In this case, the amplifier circuit includes a Wilkinson power divider and a Wilkinson power combiner instead of the transformers 14B and 15B, respectively.

Second Embodiment

A second embodiment will be described below. The second embodiment is different from the first embodiment mainly in that a signal of band C, as well as signals of band A and band B, can be transmitted. The second embodiment will be described below with reference to FIG. 7 mainly by referring to the points different from the first embodiment.

2.1 Circuit Configuration of Radio-Frequency Circuit 1A

Figure 7:
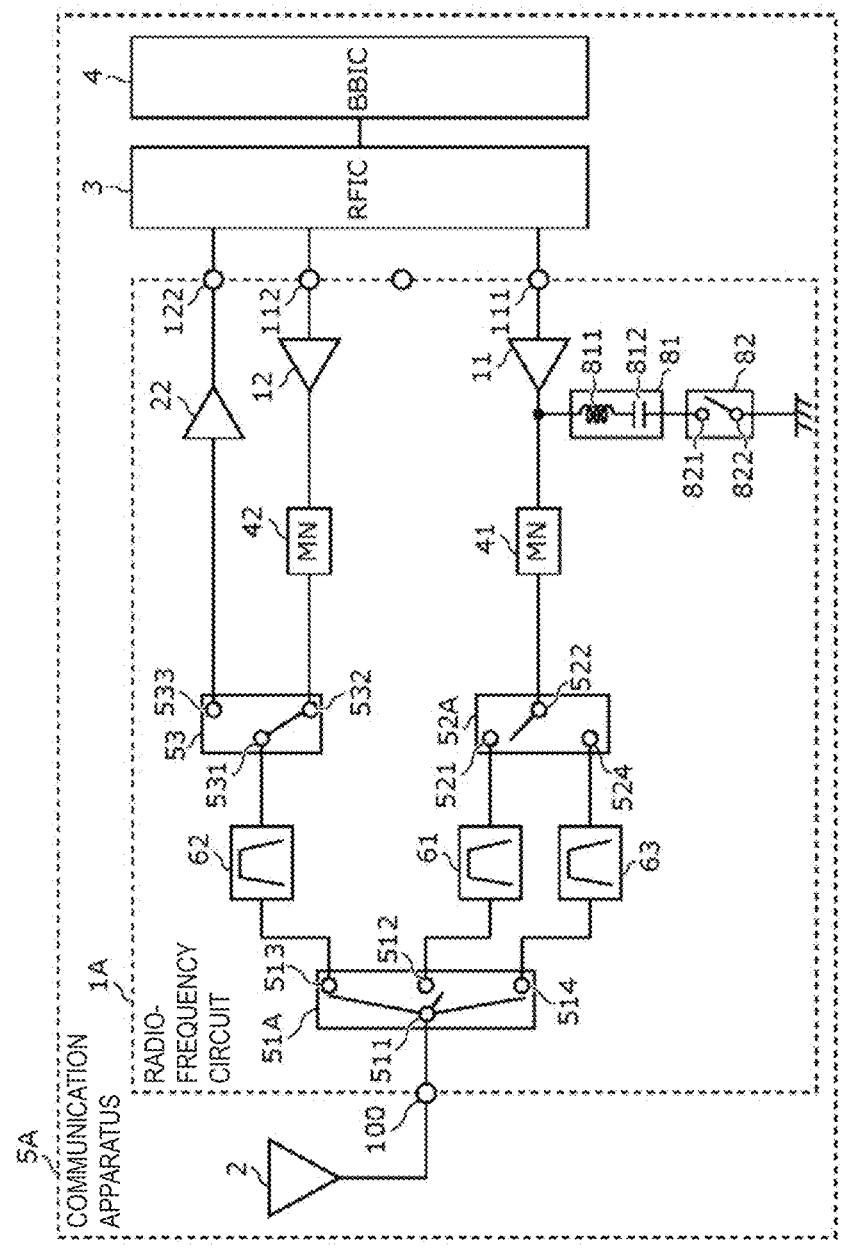
FIG. 7 is a circuit diagram of a radio-frequency circuit and a communication apparatus according to a second embodiment.

The circuit configuration of a radio-frequency circuit 1A according to the second embodiment will be discussed below with reference to FIG. 7. FIG. 7 is a circuit diagram of the radio-frequency circuit 1A and a communication apparatus 5A according to the second embodiment. The circuit configuration of the communication apparatus 5A is similar to that of the communication apparatus 5 of the first embodiment, except that the communication apparatus 5A includes the radio-frequency circuit 1A instead of the radio-frequency circuit 1, and an explanation thereof will thus be omitted.

As illustrated in FIG. 7, the radio-frequency circuit 1A includes power amplifiers 11 and 12, a low-noise amplifier 22, matching circuits 41 and 42, switches 51A, 52A, 53, and 82, filters 61 through 63, an attenuation circuit 81, an antenna connecting terminal 100, radio-frequency input terminals 111 and 112, and a radio-frequency output terminal 122.

The switch 51A is connected between the antenna connecting terminal 100 and the filters 61 through 63. The switch 51A has terminals 511 through 514. The terminal 514 is connected to the filter 63.

With this connection configuration, the switch 51A can connect the terminal 511 to one or a certain combination of the terminals 512 through 514, based on a control signal from the RFIC 3, for example. This will be discussed more specifically. The switch 51A can selectively connect or disconnect the antenna connecting terminal 100 to or from the filter 61. The switch 51A can also selectively connect or disconnect the antenna connecting terminal 100 to or from the filter 62. The switch 51A can also selectively connect or disconnect the antenna connecting terminal 100 to or from the filter 63. That is, the switch 51A can independently perform the switching operation to connect or disconnect the antenna connecting terminal 100 to or from the filter 61, that to connect or disconnect the antenna connecting terminal 100 to or from the filter 62, and that to connect or disconnect the antenna connecting terminal 100 to or from the filter 63. The switch 51A is constituted by a multiple-connection switch circuit, for example.

The switch 52A is connected between the power amplifier 11 and the filters 61 and 63. The switch 52A has terminals 521, 522, and 524. The terminal 524 is connected to the filter 63.

With this connection configuration, the switch 52A can connect the terminal 522 to the terminal 521 and/or to the terminal 524, based on a control signal from the RFIC 3, for example. This will be discussed more specifically. The switch 52A can selectively connect or disconnect the power amplifier 11 to or from the filter 61. The switch 52A can selectively connect or disconnect the power amplifier 11 to or from the filter 63. That is, the switch 51A can independently perform the switching operation to connect or disconnect the power amplifier 11 to or from the filter 61 and that to connect or disconnect the power amplifier 11 to or from the filter 63. The switch 52A is constituted by a multiple-connection switch circuit, for example.

The filter 63 is an example of a third filter. The filter 63 has a pass band including band C and is connected between the power amplifier 11 and the antenna connecting terminal 100. More specifically, one end of the filter 63 is connected to the power amplifier 11 via the switch 52A and the matching circuit 41, while the other end of the filter 63 is connected to the antenna connecting terminal 100 via the switch 51A. The filter 63 can pass a transmission signal of band C amplified by the power amplifier 11 to the antenna connecting terminal 100.

In the second embodiment, as well as in the first embodiment, based on a control signal from the RFIC 3, for example, the switch 82 connects the terminal 821 to the terminal 822 assuming the radio-frequency circuit 1A is in a state to perform simultaneous communication of band A and band B and does not connect the terminal 821 to the terminal 822 assuming the radio-frequency circuit 1A is not in a state to perform simultaneous communication of band A and band B.

2.2 Specific Examples of Bands a, B, and C

Some specific examples of bands A, B, and C that can be used in the second embodiment will be discussed below.

Band C is an example of a third band. Band C is higher than band A and is lower than band B. Any power class can be used for band C. The radio-frequency circuit 1A may be able to perform simultaneous communication of band C with band A and/or band B, though it is not essential.

For example, assuming n77 for 5GNR is used as band A and n46 or n96 for 5GNR is used for band B, n78 or n79 for 5GNR or Band 42 or Band 48 for LTE may be used as band C.

For example, assuming n79 for 5GNR is used as band A and Band 42 or Band 48 for LTE is used for band B, n46 for 5GNR may be used as band C.

For example, assuming n77, n78, or n79 for 5GNR is used as band A and n96 for 5GNR is used for band B, n46 for 5GNR may be used as band C.

2.3 Advantages and Others

As described above, a radio-frequency circuit 1A according to the second embodiment may include a filter 63. The filter 63 has a pass band including band C, which is higher than band A and lower than band B. The filter 63 is connected between the power amplifier 11 and the antenna connecting terminal 100.

With this configuration, the radio-frequency circuit 1A can use the power amplifier 11 for band A and band C. The number of components of the radio-frequency circuit 1A can thus be reduced.

In one example, in the radio-frequency circuit 1A according to the second embodiment: band A may be n77 for 5GNR; band B may be n46 or n96 for 5GNR; and band C may be n78 or n79 for 5GNR or Band 42 or Band 48 for LTE.

With this configuration, the radio-frequency circuit 1A can be used to transmit a signal of n78 or n79 for 5GNR or Band 42 or Band 48 for LTE, as well as to perform simultaneous transmission of a signal of n77 for 5GNR and a signal of n46 or n96 for 5GNR and/or to perform simultaneous transmission and reception of a signal of n77 for 5GNR and a signal of n46 or n96 for 5GNR.

In another example, in the radio-frequency circuit 1A according to the second embodiment: band A may be n79 for 5GNR; band B may be Band 42 or Band 48 for LTE; and band C may be n46 for 5GNR.

With this configuration, the radio-frequency circuit 1A can be used to transmit a signal of n46 for 5GNR, as well as to perform simultaneous transmission of a signal of n79 for 5GNR and a signal of Band 42 or Band 48 for LTE and/or to perform simultaneous transmission and reception of a signal of n79 for 5GNR and a signal of Band 42 or Band 48 for LTE.

In another example, in the radio-frequency circuit 1A according to the second embodiment: band A may be n77, n78, or n79 for 5GNR; band B may be n96 for 5GNR; and band C may be n46 for 5GNR.

With this configuration, the radio-frequency circuit 1A can be used to transmit a signal of n46 for 5GNR, as well as to perform simultaneous transmission of a signal of n77, n78, or n79 for 5GNR and a signal of n96 for 5GNR and/or to perform simultaneous transmission and reception of a signal of n77, n78, or n79 for 5GNR and a signal of n96 for 5GNR.

A communication apparatus 5A according to the second embodiment includes an RFIC 3 that processes a radio-frequency signal and the radio-frequency circuit 1A that transfers a radio-frequency signal between the RFIC 3 and an antenna 2.

With this configuration, the advantages of the radio-frequency circuit 1A can be implemented by the communication apparatus 5A.

Third Embodiment

A third embodiment will be described below. The third embodiment is different from the first and second embodiments mainly in that an attenuation circuit is connected, not to a transmit path between a power amplifier supporting the first power class and an antenna connecting terminal, but to a transmit path between a power amplifier supporting the second power class and the antenna connecting terminal. The third embodiment will be described below with reference to FIGS. 8 through 10 mainly by referring to the points different from the first and second embodiments.

3.1 Circuit Configuration of Radio-Frequency Circuit 1B

Figure 8:
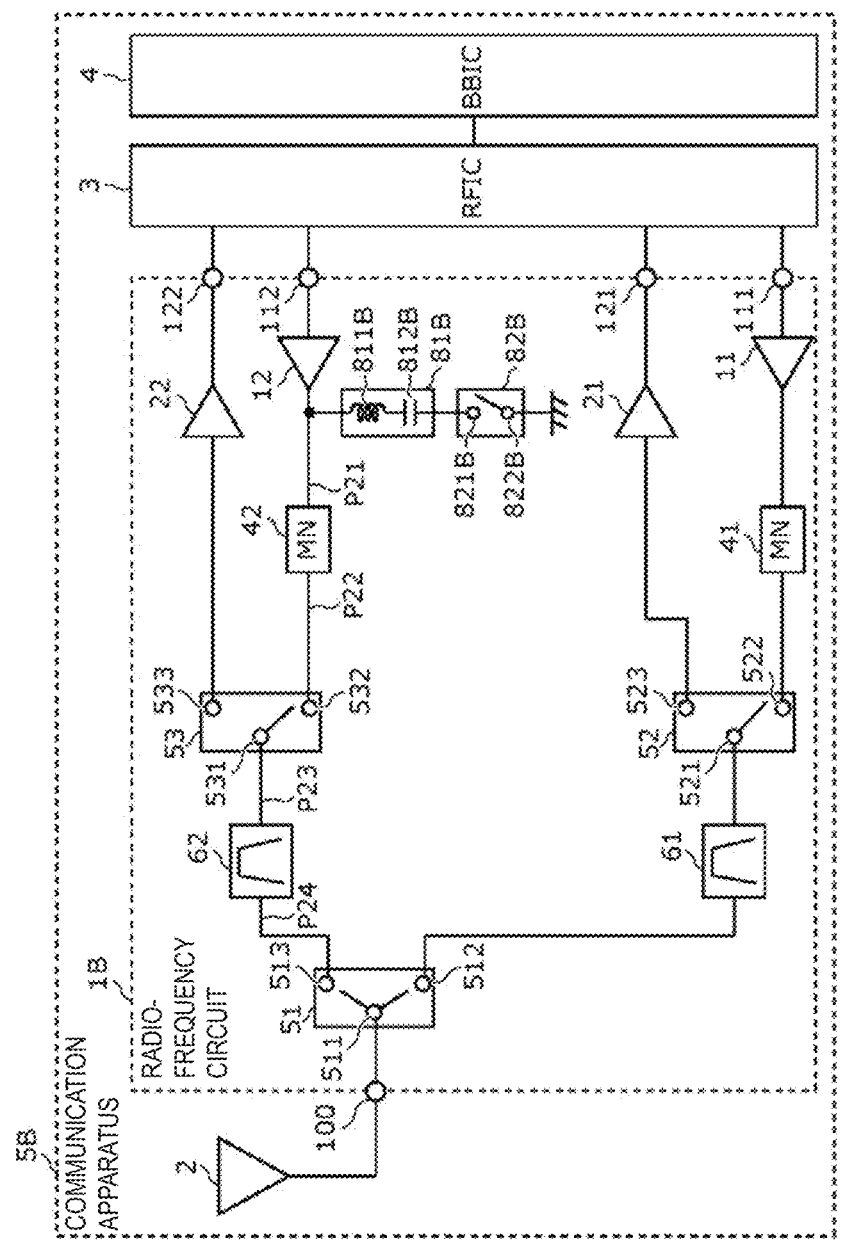
FIG. 8 is a circuit diagram of a radio-frequency circuit and a communication apparatus according to a third embodiment.

The circuit configuration of a radio-frequency circuit 1B according to the third embodiment will be discussed below with reference to FIG. 8. FIG. 8 is a circuit diagram of the radio-frequency circuit 1B and a communication apparatus 5B according to the third embodiment. The circuit configuration of the communication apparatus 5B is similar to that of the communication apparatus 5 of the first embodiment, except that the communication apparatus 5B includes the radio-frequency circuit 1B instead of the radio-frequency circuit 1, and an explanation thereof will thus be omitted.

As illustrated in FIG. 8, the radio-frequency circuit 1B includes power amplifiers 11 and 12, low-noise amplifiers 21 and 22, matching circuits 41 and 42, switches 51 through 53 and 82B, filters 61 and 62, an attenuation circuit 81B, an antenna connecting terminal 100, radio-frequency input terminals 111 and 112, and radio-frequency output terminals 121 and 122.

The attenuation circuit 81B has an attenuation band including at least part of band A. The attenuation circuit 81B includes an inductor 811B and a capacitor 812B connected in series with each other between a ground and a transmit path which connects the power amplifier 12 and the antenna connecting terminal 100. In the example in FIG. 8, the attenuation circuit 81B is connected between a ground and a transmit path P21 between the power amplifier 12 and the matching circuit 42. The attenuation circuit 81B is thus disposed on a low-impedance-system path. The provision of the capacitor 812B in the attenuation circuit 81B may be omitted.

The switch 82B can switch between ON and OFF of a parallel arm path on which the attenuation circuit 81B is disposed. The specific configuration of the switch 82B is as follows. The switch 82B has terminals 821B and 822B. The terminal 821B, which is an example of the first terminal, is connected to the attenuation circuit 81B. The terminal 822B, which is an example of the second terminal, is connected to a ground.

With this connection configuration, based on a control signal from the RFIC 3, for example, the switch 82B connects the terminal 821B to the terminal 822B assuming the radio-frequency circuit 1B is in a state to perform simultaneous communication of band A and band B and does not connect the terminal 821B to the terminal 822B assuming the radio-frequency circuit 1B is not in a state to perform simultaneous communication of band A and band B. The switch 82B is constituted by a SPST switch circuit, for example.

In the example in FIG. 8, the switch 82B is connected between the attenuation circuit 81B and a ground. However, the position of the switch 82B is not limited to this position. For example, the switch 82B may be connected between the attenuation circuit 81B and the transmit path P21. In this case, the terminal 821B is connected to the attenuation circuit 81B and the terminal 822B is connected to the transmit path P21.

The attenuation circuit 81B and the switch 82B are connected between the transmit path P21 and a ground. However, the position of the attenuation circuit 81B and the switch 82B is not limited to this position. For example, the attenuation circuit 81B and the switch 82B may be connected between a ground and one of a transmit path P22 between the matching circuit 42 and the switch 53, a transmit path P23 between the switch 53 and the filter 62, and a transmit path P24 between the filter 62 and the switch 51.

Figure 9:
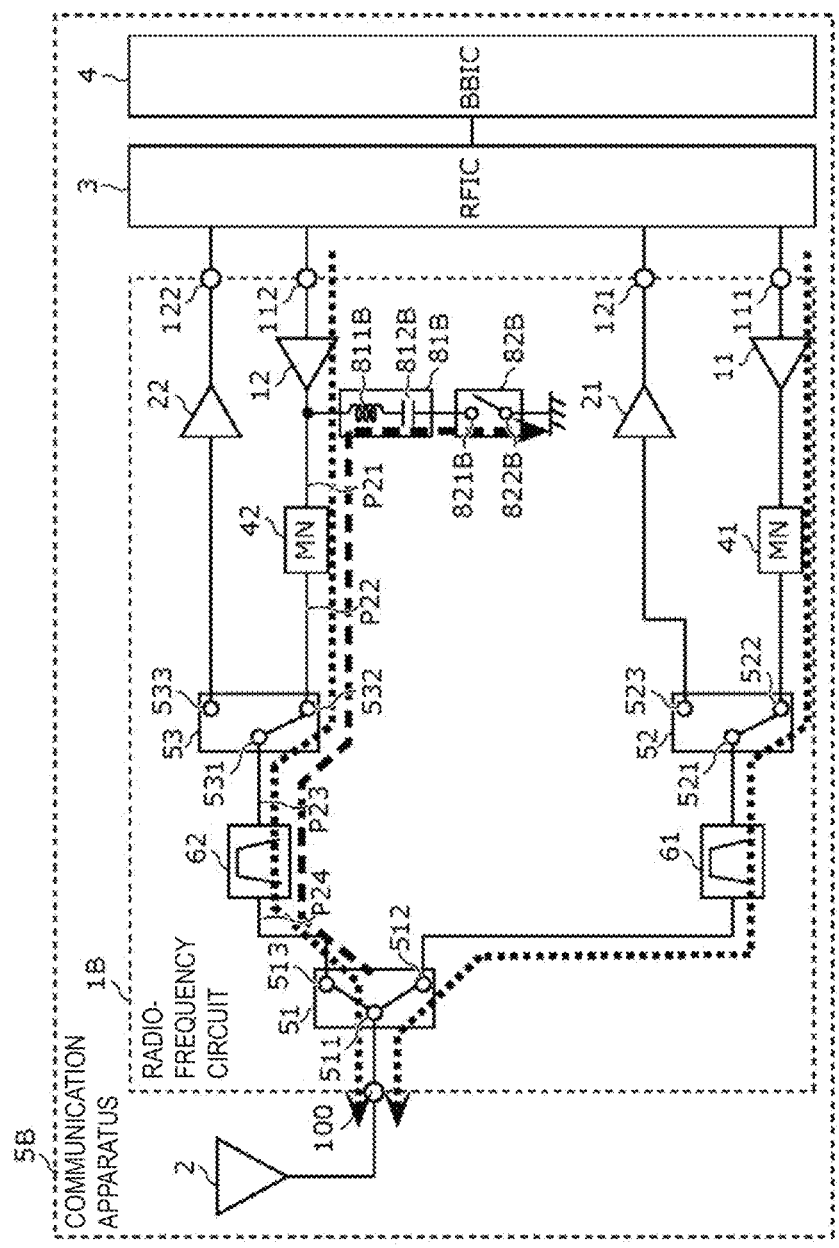
FIG. 9 illustrates a signal flow in a first connection state of the radio-frequency circuit and the communication apparatus according to the third embodiment.
Figure 10:
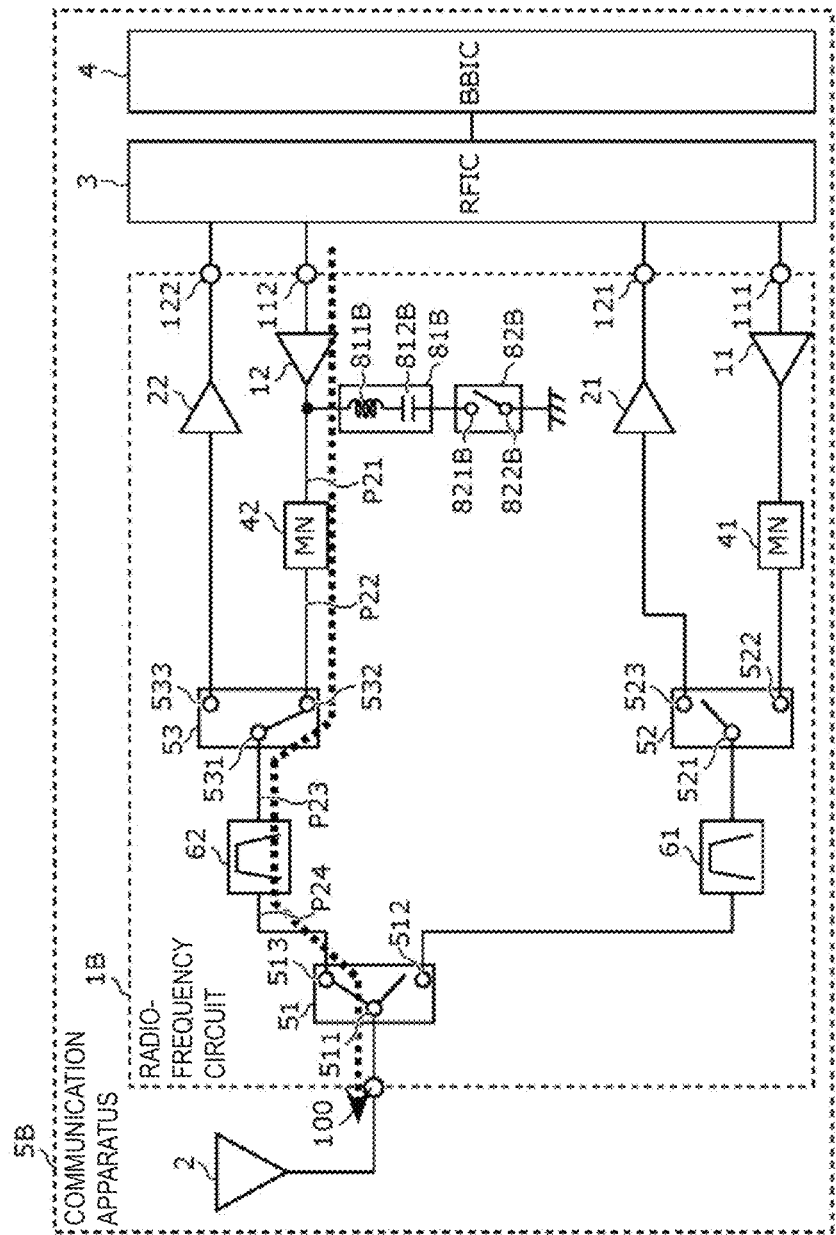
FIG. 10 illustrates a signal flow in a second connection state of the radio-frequency circuit and the communication apparatus according to the third embodiment.

3.2 Signal Flows in Individual Connection States of Radio-Frequency Circuit 1B Connection states of the radio-frequency circuit 1B according to the third embodiment and specific examples of a signal flow in each connection state will now be explained below with reference to FIGS. 9 and 10. FIG. 9 illustrates a signal flow in a first connection state of the radio-frequency circuit 1B. FIG. 10 illustrates a signal flow in a second connection state of the radio-frequency circuit 1B.

FIG. 9 illustrates the first connection state in which the radio-frequency circuit 1B simultaneously performs the transmission of band A and the transmission of band B. That is, FIG. 9 shows a state in which the radio-frequency circuit 1B performs simultaneous communication of band A and band B. The RFIC 3 can implement the first connection state by controlling the switch circuits of the radio-frequency circuit 1B. In the first connection state: the switch 51 connects the terminal 511 to both of the terminals 512 and 513; the switch 52 connects the terminal 521 to the terminal 522; and the switch 53 connects the terminal 531 to the terminal 532. In this state, the switch 82B connects the terminal 821B to the terminal 822B.

With this connection state, a transmission signal of band A flows from the radio-frequency input terminal 111 to the antenna connecting terminal 100 via the power amplifier 11, matching circuit 41, switch 52, filter 61, and switch 51. During the flowing of the transmission signal of band A, components of the transmission signal of band A having leaked to the transmit paths P21 through P24 flow to a ground via the attenuation circuit 81B and the switch 82B. Meanwhile, a transmission signal of band B flows from the radio-frequency input terminal 112 to the antenna connecting terminal 100 via the power amplifier 12, matching circuit 42, switch 53, filter 62, and switch 51.

FIG. 10 illustrates the second connection state of the radio-frequency circuit 1B in which the transmission of band A is not performed, but the transmission of band B is performed. That is, FIG. 10 shows a state in which the radio-frequency circuit 1B does not perform simultaneous communication of band A and band B. The RFIC 3 can implement the second connection state by controlling the switch circuits of the radio-frequency circuit 1B. In the second connection state: the switch 51 connects the terminal 511 to the terminal 513; and the switch 53 connects the terminal 531 to the terminal 532. In this state, the switch 82B does not connect the terminal 821B to the terminal 822B.

With this connection state, a transmission signal of band B flows from the radio-frequency input terminal 112 to the antenna connecting terminal 100 via the power amplifier 12, matching circuit 42, switch 53, filter 62, and switch 51. During the flowing of the transmission signal of band B, no signal flows through the attenuation circuit 81B.

3.3 Advantages and Others

As described above, a radio-frequency circuit 1B according to the third embodiment includes power amplifiers 11 and 12, filters 61 and 62, an attenuation circuit 81B, and a switch 82B. The power amplifier 11 supports a first power class which allows for maximum output power higher than power class 3. The filter 61 has a pass band including band A and is connected between the power amplifier 11 and an antenna connecting terminal 100. The filter 62 has a pass band including band B and is connected between the power amplifier 12 and the antenna connecting terminal 100. The radio-frequency circuit 1B can perform simultaneous communication of band A and band B. The attenuation circuit 81B and the switch 82B are connected in series with each other between a ground and a transmit path which connects the power amplifier 12 and the antenna connecting terminal 100. The attenuation circuit 81B has an attenuation band including at least part of band A and includes an inductor 811B which is connected between the transmit path and the ground. The switch 82B has a terminal 821B connected to the attenuation circuit 81B and a terminal 822B connected to the transmit path or the ground. The switch 82B connects the terminal 821B to the terminal 822B assuming the radio-frequency circuit 1B is in a state to perform simultaneous communication of band A and band B. The switch 82B does not connect the terminal 821B to the terminal 822B assuming the radio-frequency circuit 1B is not in the state to perform simultaneous communication of band A and band B.

With the above-described configuration, assuming the radio-frequency circuit 1B is in a state to perform simultaneous communication of band A and band B, the attenuation circuit 81B can be connected to the transmit path of a signal of band B. It is thus possible to attenuate components of a transmission signal of band A having leaked to the transmit path of band B. This can reduce distortion occurring in nonlinear elements (such as the power amplifier 12) caused by the components of the transmission signal of band A. It is thus less likely to degrade the quality of the transmission signal of band B for which the radio-frequency circuit 1B performs simultaneous communication together with the transmission signal of band A. Assuming the radio-frequency circuit 1B is not in the state to perform simultaneous communication of band A and band B, the attenuation circuit 81B is not connected to the transmit path of a signal of band B. This can reduce a signal loss and a mismatching loss which would be caused by the attenuation circuit 81B, thereby improving the electrical characteristics of the radio-frequency circuit 1B.

In one example, in the radio-frequency circuit 1B according to the third embodiment, the attenuation circuit 81B may also include a capacitor 812B, which is connected in series with the inductor 811B, between the transmit path and the ground.

With this configuration, too, the radio-frequency circuit 1B can achieve advantages similar to those described above.

In one example, the radio-frequency circuit 1B according to the third embodiment may also include a matching circuit 42 that is connected between the power amplifier 12 and the filter 62. The attenuation circuit 81B may be connected between the power amplifier 12 and the matching circuit 42.

With this configuration, an LC series circuit is disposed on a parallel arm path of the output impedance (that is, low impedance) system of the power amplifier 12. The LC series circuit can thus function as an attenuation pole having a low Q factor. The attenuation circuit 81B can thus implement the attenuation in a wide band.

In one example, in the radio-frequency circuit 1B according to the third embodiment, the terminal 822B of the switch 82B may be connected to the ground.

With this configuration, assuming the switch 82B is constituted by an FET, the source of the FET can be connected to the ground. Assuming the switch 82B is turned ON with the application of a voltage to the gate of the FET, the potential difference between the gate and the source can be increased, thereby reducing the impedance between the drain and the source.

In one example, in the radio-frequency circuit 1B according to the third embodiment, the power amplifier 12 may support a second power class which allows for maximum output power lower than or equal to power class 3.

With this configuration, a transmission signal of band B corresponding to the second power class can be simultaneously transmitted with a transmission signal of band A corresponding to the first power class. During the simultaneous transmission, the degradation of the transmission signal of band B can be reduced.

In one example, in the radio-frequency circuit 1B according to the third embodiment, band A may be n77, n78, n79, or n41 for 5GNR, and band B may be n46 or n96 for 5GNR.

With this configuration, the radio-frequency circuit 1B can be used to perform simultaneous transmission of a signal of n77, n78, n79, or n41 for 5GNR and a signal of n46 or n96 for 5GNR and/or to perform simultaneous transmission and reception of a signal of n77, n78, n79, or n41 for 5GNR and a signal of n46 or n96 for 5GNR.

In one example, in the radio-frequency circuit 1B according to the third embodiment, band A may be n79 for 5GNR, and band B may be Band 42 or Band 48 for LTE.

With this configuration, the radio-frequency circuit 1B can be used to perform simultaneous transmission of a signal of n79 for 5GNR and a signal of Band 42 or Band 48 for LTE and/or to perform simultaneous transmission and reception of a signal of n79 for 5GNR and a signal of Band 42 or Band 48 for LTE.

A communication apparatus 5B according to the third embodiment includes an RFIC 3 that processes a radio-frequency signal and the radio-frequency circuit 1B that transfers a radio-frequency signal between the RFIC 3 and an antenna 2.

With this configuration, the advantages of the radio-frequency circuit 1B can be implemented by the communication apparatus 5B.

OTHER EMBODIMENTS

The radio-frequency circuits and communication apparatuses have been discussed above through illustration of the embodiments. However, the radio-frequency circuits and communication apparatuses of the disclosure are not restricted to those in the above-described embodiments. Other embodiments implemented by combining certain elements in the above-described embodiments and other modified examples obtained by making various modifications to the above-described embodiments by those skilled in the art without departing from the scope and spirit of the disclosure are also encompassed in the disclosure. Various types of equipment integrating the above-described radio-frequency circuits are also encompassed in the disclosure.

For example, in the circuit configurations of the radio-frequency circuits and communication apparatuses according to the embodiments, another circuit element and another wiring, for example, may be inserted onto a path connecting circuit elements and a signal path illustrated in the drawings. For instance, an impedance matching circuit may be inserted between the filter 61 and the low-noise amplifier 21 and/or between the filter 62 and the low-noise amplifier 22. In this case, the impedance matching circuit can be constituted by an inductor and/or a capacitor, for example.

In each of the above-described embodiments, the communication apparatus includes one antenna. However, the disclosure is not restricted to this configuration. For example, the communication apparatus may include multiple antennas. In this case, the signal path of band A and the signal path of band B may be connected to different antennas.

Although band B and the power amplifier 12 do not support the first power class in the above-described embodiments, they may support the first power class. That is, band A and band B may both correspond to the first power class, while the power amplifiers 11 and 12 may both support the first power class.

In each of the above-described embodiments, one attenuation circuit is included in the radio-frequency circuit. However, the disclosure is not restricted to this configuration. For example, the radio-frequency circuit may include multiple attenuation circuits. In this case, multiple attenuation circuits may be connected to a desired combination of the transmit paths P11 through P14 or to a desired combination of the transmit paths P21 through P24. Multiple attenuation circuits may be connected to at least one of the transmit paths P11 through P14 and to at least one of the transmit paths P21 through P24.

The radio-frequency circuit according to each of the above-described embodiments may be distributed over plural module laminates and be mounted on them. Additionally, the switch 51 or 51A may be replaced by a multiplexer. The module configuration of such a radio-frequency circuit will be discussed below with reference to FIG. 11.

Figure 11:
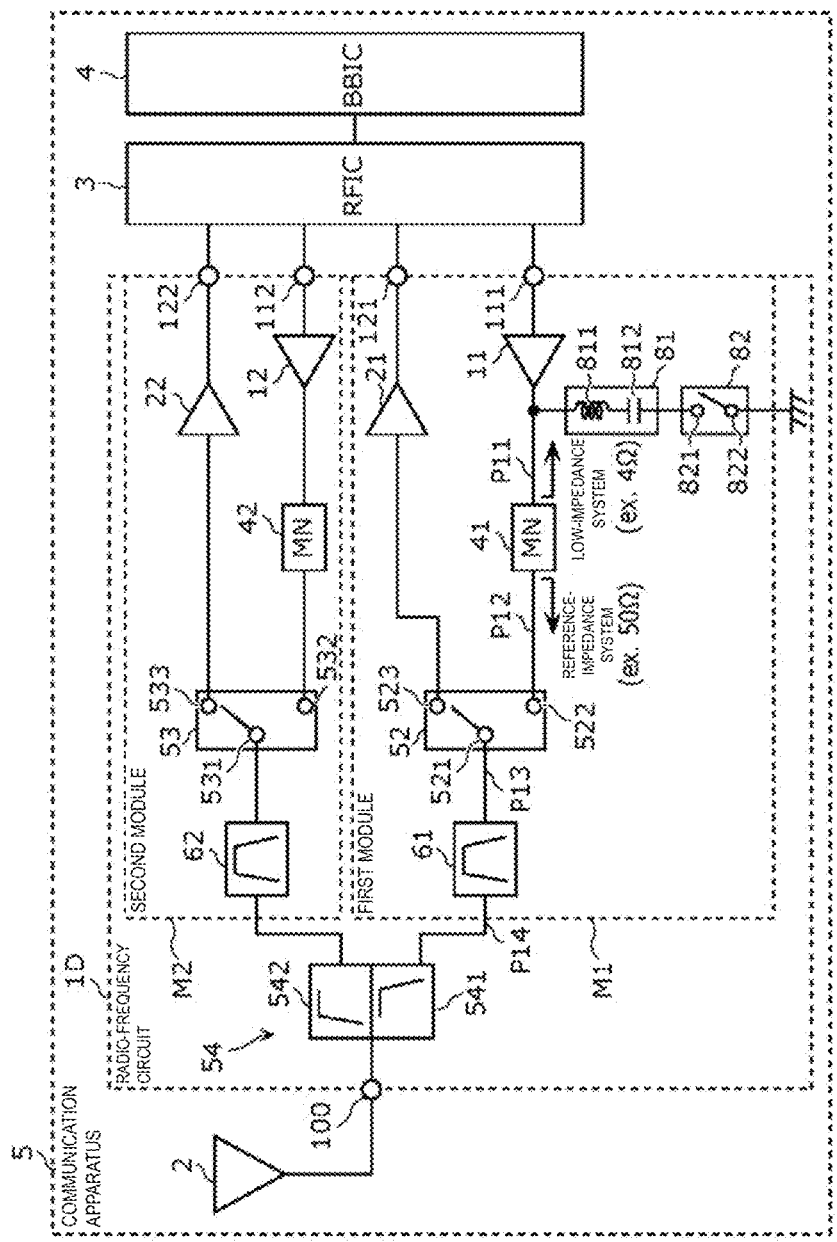
FIG. 11 is a schematic diagram of the module configuration of a radio-frequency circuit according to another embodiment.

FIG. 11 is a schematic diagram of the module configuration of a radio-frequency circuit 1D according to another embodiment. The radio-frequency circuit 1D is based on the radio-frequency circuit 1 of the first embodiment and is different from the first embodiment in that it includes a multiplexer 54 instead of the switch 51.

The multiplexer 54 includes a low pass filter 541 and a high pass filter 542. The low pass filter 541 is connected between the antenna connecting terminal 100 and the filter 61, while the high pass filter 542 is connected between the antenna connecting terminal 100 and the filter 62.

The radio-frequency circuit 1D is distributed over two modules (first module M1 and second module M2). That is, the radio-frequency circuit 1D is distributed over two module laminates and is mounted on them. The elements included in the first module M1 and those in the second module M2 are as follows. The first module M1 includes the power amplifier 11, low-noise amplifier 21, matching circuit 41, switch 52, filter 61, attenuation circuit 81, radio-frequency input terminal 111, and radio-frequency output terminal 121. The second module M2 includes the power amplifier 12, low-noise amplifier 22, matching circuit 42, switch 53, filter 62, radio-frequency input terminal 112, and radio-frequency output terminal 122.

In the example in FIG. 11, a pass band including n41 for 5GNR may be used as the pass band of the filter 61, while a pass band including 2.4 GHz band for WLAN may be used as the pass band of the filter 62. Alternatively, a pass band including n77, n78, n79, or a desired combination thereof may be used as the pass band of the filter 61, while a pass band including n46 for 5GNR and/or 5 GHz band for WLAN may be used as the pass band of the filter 62.

The radio-frequency circuit 1D based on the radio-frequency circuit 1 of the first embodiment has been discussed with reference to FIG. 11. Likewise, each of the radio-frequency circuit 1A of the second embodiment and the radio-frequency circuit 1B of the third embodiment can also be distributed over two module laminates and be mounted on them.

The present disclosure can be widely used, as a radio-frequency circuit provided in a front-end device, for communication equipment, such as a mobile phone.

What is claimed is:

1. A radio-frequency circuit comprising:
   a first power amplifier that supports a first power class, the first power class allowing for maximum output power higher than power class 3;
   a first filter that has a pass band including a first band and that is connected between the first power amplifier and an antenna connecting terminal;
   a second filter that has a pass band including a second band and that is connected to the antenna connecting terminal; the radio-frequency circuit being able to perform simultaneous communication of the first band and the second band; and
   an attenuation circuit and a switch that are connected in series with each other between a ground and a transmit path, the transmit path connecting the first power amplifier and the antenna connecting terminal, wherein
   the attenuation circuit has an attenuation band including at least part of the second band and includes an inductor which is connected between the transmit path and the ground,
   the switch has a first terminal connected to the attenuation circuit and a second terminal connected to the transmit path or the ground, and
   the switch connects the first terminal to the second terminal based on the radio-frequency circuit being in a state to perform simultaneous communication of the first band and the second band, and the switch does not connect the first terminal to the second terminal based on the radio-frequency circuit not being in the state to perform simultaneous communication of the first band and the second band.

2. The radio-frequency circuit according to claim 1, wherein the attenuation circuit further includes a capacitor, which is connected in series with the inductor, between the transmit path and the ground.

3. The radio-frequency circuit according to claim 1, further comprising:
   an impedance matching circuit that is connected between the first power amplifier and the first filter,
   wherein the attenuation circuit is connected between the first power amplifier and the impedance matching circuit.

4. The radio-frequency circuit according to claim 1, wherein the second terminal of the switch is connected to the ground.

5. The radio-frequency circuit according to claim 1, further comprising:
   a second power amplifier,
   wherein the second filter is connected between the antenna connecting terminal and the second power amplifier.

6. The radio-frequency circuit according to claim 5, wherein the second power amplifier supports a second power class, the second power class allowing for maximum output power lower than or equal to the power class 3.

7. The radio-frequency circuit according to claim 1, further comprising:
   a low-noise amplifier,
   wherein the second filter is connected between the antenna connecting terminal and the low-noise amplifier.

8. The radio-frequency circuit according to claim 1, further comprising:
   a third filter that has a pass band including a third band, the third band being higher than the first band and lower than the second band, and that is connected between the first power amplifier and the antenna connecting terminal.

9. The radio-frequency circuit according to claim 1, wherein:
   the first band is n77, n78, n79, or n41 for 5GNR; and the second band is n46 or n96 for 5GNR.

10. The radio-frequency circuit according to claim 1, wherein:
the first band is n79 for 5GNR; and
the second band is Band 42 or Band 48 for LTE.

11. The radio-frequency circuit according to claim 8, wherein:
the first band is n77 for 5GNR;
the second band is n46 or n96 for 5GNR; and
the third band is n78 or n79 for 5GNR or Band 42 or Band 48 for LTE.

12. The radio-frequency circuit according to claim 8, wherein:
the first band is n79 for 5GNR;
the second band is Band 42 or Band 48 for LTE; and
the third band is n46 for 5GNR.

13. The radio-frequency circuit according to claim 8, wherein:
the first band is n77, n78, or n79 for 5GNR;
the second band is n96 for 5GNR; and
the third band is n46 for 5GNR.

14. A radio-frequency circuit comprising:
a first power amplifier that supports a first power class, the first power class allowing for maximum output power higher than power class 3;
a second power amplifier;
a first filter that has a pass band including a first band and that is connected between the first power amplifier and an antenna connecting terminal;
a second filter that has a pass band including a second band and that is connected between the second power amplifier and the antenna connecting terminal, the radio-frequency circuit being able to perform simultaneous communication of the first band and the second band; and
an attenuation circuit and a switch that are connected in series with each other between a ground and a transmit path, the transmit path connecting the second power amplifier and the antenna connecting terminal, wherein the attenuation circuit has an attenuation band including at least part of the first band and includes an inductor which is connected between the transmit path and the ground,
the switch has a first terminal connected to the attenuation circuit and a second terminal connected to the transmit path or the ground, and
the switch connects the first terminal to the second terminal based on the radio-frequency circuit being in a state to perform simultaneous communication of the first band and the second band, and the switch does not connect the first terminal to the second terminal based on the radio-frequency circuit not being in the state to perform simultaneous communication of the first band and the second band.

15. The radio-frequency circuit according to claim 14, wherein the attenuation circuit further includes a capacitor, which is connected in series with the inductor, between the transmit path and the ground.

16. The radio-frequency circuit according to claim 14, further comprising:
an impedance matching circuit that is connected between the second power amplifier and the second filter,
wherein the attenuation circuit is connected between the second power amplifier and the impedance matching circuit.

17. The radio-frequency circuit according to claim 14, wherein the second terminal of the switch is connected to the ground.

18. The radio-frequency circuit according to claim 14, wherein the second power amplifier supports a second power class, the second power class allowing for maximum output power lower than or equal to the power class 3.

19. The radio-frequency circuit according to claim 14, wherein:
the first band is n77, n78, n79, or n41 for 5GNR; and
the second band is n46 or n96 for 5GNR.

20. The radio-frequency circuit according to claim 14, wherein:
the first band is n79 for 5GNR; and
the second band is Band 42 or Band 48 for LTE.

* * * * *